Nov. 13, 1956    W. O. TEETERS, ET AL    2,770,606
SOLUTIONS OF COPOLYMERS OF A PERFLUOROCHLOROETHYLENE
AND A FLUOROETHYLENE
Filed Dec. 16, 1954
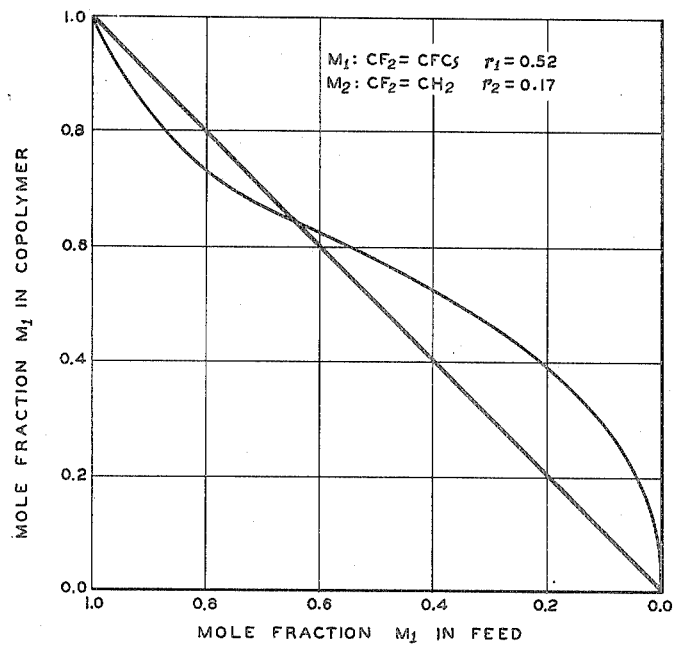
INVENTORS
ALBERT L. DITTMAN
HERBERT J. PASSINO
BY WILBER O. TEETERS
ATTORNEYS

United States Patent Office 2,770,606
Patented Nov. 13, 1956

2,770,606

SOLUTIONS OF COPOLYMERS OF A PERFLUO-ROCHLOROETHYLENE AND A FLUORO-ETHYLENE

Wilber O. Teeters, River Edge, Herbert J. Passino, Englewood, and Albert L. Dittman, North Bergen, N. J., assignors to The M. W. Kellogg Company, Jersey City, N. J., a corporation of Delaware Application December 16, 1954, Serial No. 475,776

20 Claims. (Cl. 260—31.2)

This invention relates to halogen-containing polymeric materials. In one aspect, the invention relates to halogen-containing copolymers. More particularly in this aspect, the invention relates to copolymers of a perfluorochloroethylene and a fluoroethylene and solvents therefor.

This invention is a continuation-in-part of our prior and copending applications Serial No. 213,298, filed February 28, 1951, now U. S. Patent No. 2,738,343, and Serial No. 332,218, filed January 21, 1953.

As an accumulative group, halogen-containing polymers offer wide utility in various industrial applications, serving not only as substitutes for natural rubbers, but in some instances the various individual synthetics are superior to the natural products, e. g., in oil-resistance and aging characteristics. In this respect, polymers containing fluorine have been found to be both relatively inert and to possess good physical and chemical stability. One of the most useful polymers in this field is the perfluorochloroethylene polymer of trifluorochloroethylene. This particular polymer of trifluorochloroethylene has now been developed to a stage in which it is commercially available and has many useful applications by reason of its chemical inertness, and high physical strength and resilience, when in the form of a plastic. Four-fifths of the weight of polytrifluorochloroethylene is made up of fluorine and chlorine. The plastic form of polytrifluorochloroethylene is colorless and transparent, and has a high chemical stability with no effect being observed on the polymer after prolonged exposure to hydrofluoric acid, hydrochloric acid, and strong caustic solutions, as well as concentrated sulfuric acid, fuming nitric acid, aqua regia and other vigorous oxidizing materials. The plastic form of this polymer exhibits flexibility and resilience, is not affected by water, or by humidity, and, in general, is an efficient insulating material.

With particular reference to the utility of perfluorochloroethylene polymers, such as trifluorochloroethylene, it has been found desirable to employ these polymers as substitutes for natural rubbers, with the added physical and chemical advantages, as mentioned above, inherent in those polymers themselves. In this respect, the rubber-like polymers to be produced should display elastomeric properties, high tensile strength, flexibility at relatively low temperatures and should be easily vulcanized. While trifluorochloroethylene, however, as a perfluorochloroethylene polymer, possesses the above-mentioned physical and chemical properties, no synthetic rubber has been developed, prior to this invention, which possesses chemical inertness, high tensile strength, low temperature properties of flexibility, solubility in various solvents and vehicles, and which is also elastomeric and easily vulcanized.

It is, therefore, an object of this invention to provide new elastomeric copolymers having desirable physical and chemical characteristics, exhibiting the properties of corrosion-resistance to oils, fuels and various powerful reagents, and at the same time, possessing high tensile strength, flexibility at relatively low temperatures, solubility in various solvents and vehicles, and which are elastomeric and easily vulcanized.

It is another object of this invention to provide solvents for these copolymers which solvents can be used to prepare solutions which are useful in the application of copolymer surfaces by various coating techniques.

Various other objects and advantages of the present invention will become apparent to those skilled in the art from the accompanying description and disclosure.

The polymers of the present invention are elastomeric copolymers of a perfluorochloroethylene, such as trifluorochloroethylene, and a fluoroethylene, such as vinylidene fluoroethylene and are of a special value as durable fabric-coating compositions. The copolymers of the present invention contain between about 20 mole percent and about 69 mole percent of the perfluorochloroethylene, and the remaining major constitutent is a fluoroethylene. In general, as more fully hereinafter described, these copolymers are prepared by copolymerizing the perfluorochloroethylene (e. g., trifluorochloroethylene) with the fluoroethylene (e. g., vinylidine fluoride) at temperatures between about $-25°$ C. and about $50°$ C. in the presence of a polymerization catalyst, either as an inoragnic promoter in the form of a water-suspension type recipe or as an organic peroxide promoter in mass or bulk type polymerization. The copolymerization of the aforementioned monomers produces rubber-like elastomeric copolymers. These copolymers are flexible and elastic, even at temperatures as low as $-70°$ F., vulcanizable, chemically and thermally stable, oil and fuel resistant, soluble in various solvents and vehicles, and are particularly suited as durable, flexible coatings for application to fabric surfaces.

As indicated above, the polymers of the present invention are elastomeric copolymers of a perfluorochloroethylene, such as trifluorochloroethylene, ($CF_2=CFCl$), and a fluoroethylene, such as vinylidene fluoride, ($CF_2=CH_2$). Examples of other perfluorochloroethylenes that may be employed in preparing the copolymers of the present invention are 1,1-dichloro-2,2-difluoroethylene, ($CCl_2=CF_2$); 1,2-dichloro-1,2-difluoroethylene ($CFCl=CFCl$); and trichlorofluoroethylene

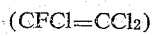
($CFCl=CCl_2$)

Examples of other fluoroethylenes that may be employed with perfluorochloroethylenes to obtain the copolymers of the present invention are trifluoroethylene

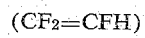
($CF_2=CFH$)

vinyl fluoride ($CFH=CH_2$) and 1,2-difluoroethylene ($CFH=CFH$).

In carrying out the polymerization reaction between the perfluorochloroethylene and the fluoroethylene monomers to produce the copolymers of the present invention, it has been indicated that the finished copolymers contain between about 20 mole percent and 69 mole percent of the perfluorochloroethylene, with the remaining major constituent being the fluoroethylene. If the finished copolymer contains less than about 20 mole percent of the perfluorochloroethylene monomer, the copolymer exhibits a tendency to lose its desirable properties of corrosion-resistance to oils, fuels and other powerful reagents, due to the high increase in fluorochloroethylene content. If on the other hand, the finished copolymer contains more than about 69 mole percent of the perfluorochloroethylene monomer, the copolymer tends to exhibit stiffness and reduced flexibility, and thus loses its desirable elastomeric properties. Within this critical range, it is preferred that the finished copolymers contain between about 25 mole percent and about 50 mole percent of the perfluorochloroethylene monomer, with the fluoroethylene monomer constituting the remaining major constituent.

To attain all the advantages inherent in each of the aforementioned copolymer systems, the copolymers of any desired composition should be as uniform as possible, that is, each polymeric molecule should contain essentially the same proportion of the perfluorochloroethylene monomer to the fluoroethylene monomer, as every other polymeric molecule in the batch. In other words, the molar ratio in a polymeric molecule should correspond as closely as possible to the other molecules in the same batch. If the respective copolymers are heterogeneous, the aforementioned desired physical and chemical properties may tend to be distorted.

The polymerization reaction is carried out, as indicated above, at a temperature between about $-25°$ C. and about $50°$ C. When the polymerization promoter is in the form of a water-suspension type recipe, the reaction is preferably carried out at a temperature between about $0°$ C. and about $35°$ C. When the polymerization promoter is an organic peroxide promoter in a mass polymerization system, the reaction is preferably carried out at a temperature between about $-20°$ C. and about $0°$ C. Of the water-suspension recipe type catalyst, a redox catalyst system is preferred (having no emulsifier), and contains an oxidant, a reductant and a variable valence metal salt. The oxidant in the water-suspension type recipe is preferably an inorganic persulfate such as potassium persulfate, sodium persulfate or ammonium persulfate, the former being most desirable. The reductant is preferably a bisulfite such as sodium bisulfite or potassium bisulfite, and preferably the former. The variable valence metal salt, which is employed for the purpose of regenerating the oxidant, is preferably in the form of an iron salt such as ferrous sulfate or ferrous nitrate with ferrous sulfate being the most desirable variable valence metal salt. Of the organic peroxide promoters halogen substituted acetyl peroxides are employed in carrying out the copolymerization in the absence of a suspension agent. Trichloroacetyl peroxide is a preferred promoter of this type. Other halogen substituted organic peroxides suitable for carrying out the copolymerization are trifluoroacetyl peroxide, difluoroacetyl peroxide, 2,4-dichlorobenzoyl peroxide, chloroacetyl peroxide, trifluorodichloropropionyl peroxide, and dichlorofluoroacetyl peroxide.

In carrying out the above-mentioned polymerization procedure, the monomer reactivity ratios for the perfluorochloroethylene and the fluoroethylene, are calculated in accordance with the Mayo, Lewis and Walling equation. This equation is represented as follows:

$$^1 \frac{d[M_1]}{d[M_2]} = \frac{[M_1]}{[M_2]} \frac{r_1[M_1] + [M_2]}{[M_1] + r_2[M_2]}$$

wherein $r_1$ and $r_2$ are parameters
$M_1$ and $M_2$ are concentrations in moles of monomer 1 and monomer 2.

The equation describes the composition of the copolymer being formed at any instant, $$\frac{d[M_1]}{d[M_2]}$$

from a polymerization mixture of two monomers at concentrations $M_1$ and $M_2$ by means of two parameters, $r_1$ and $r_2$. These parameters (i. e., the monomer reactivity ratios) each represent the ratio of two rate constants for the reaction of a chain with a given monomer unit on the growing end with its own type of monomer, and with the other type of monomer.

For producing a copolymer of trifluorochloroethylene and vinylidene fluoride, as a representative copolymer of the present invention, monomer reactivity ratios calculated in accordance with the Mayo, Lewis and Walling equation, are $r_1 = 0.52 \pm 0.12$, where $M_1$ is trifluorochloroethylene, and $r_2 = 0.17 \pm 0.02$, wherein $M_2$ is vinylidene fluoride. These values indicate that each monomer prefers to add to the other monomer rather than to itself during polymerization, and results in a strong tendency towards alternation in this system. These values also indicate that there is an azeotropic feed ratio at which the copolymer and monomer composition remain identical over the entire conversion scale.

An instantaneous copolymer feed-composition diagram, derived from the above values, is shown in the accompanying drawing. By reference to the curved line of the drawing, the proper feed may be selected for the instantaneous preparation of the copolymer, of desired composition, having between about 20 mole percent and 69 mole percent of trifluorochloroethylene, and the remaining major constituent being vinylidene fluoride.

According to this diagram, a 65/35 molar ratio of trifluorochloroethylene/vinylidene fluoride copolymer, is azeotropic, as shown by the straight line of the drawing, that is, the composition of the copolymer remains constant and equal to that of the feed over the entire range of up to approximately 100 percent conversion. If an attempt is made to prepare a particular copolymer ratio (other than the azeotropic molar ratio), by feeding a single charge of constant composition (i. e., one which has been calculated to yield instantaneously a copolymer of desired composition), the less reactive monomer will lag in the reaction. As the copolymerization proceeds, the copolymer becomes excessively rich in the more reactive monomer and assumes, to a greater degree, the properties characteristic of the more reactive monomer. As the relative concentration of the less reactive monomer to the more reactive monomer increases, the less reactive monomer is drawn more and more into the reaction. The copolymer produced becomes rich in respect to that monomer and eventually a homopolymer of the less reactive monomer will be obtained when the more reactive monomer is exhausted. This unevenness of reaction leads to an excessive spread in molar ratios found in the resulting copolymers.

In view of the inequality of reactivity, the charging of the monomers to the reactor, either in increments or as a continuous charge, should be carried out in such manner that the resulting copolymer composition varies by not more than $\pm 2$ mole percent from chain to chain.

It has been found that the perfluorochloroethylene/fluoroethylene copolymers, e. g., copolymers of trifluorochloroethylene and vinylidene fluoride, which have an initial molar ratio of 50/50, vary to such an extent that at a conversion between about 70 and 80 percent, the trifluorochloroethylene will be exhausted from the feed, and that any polymers produced thereafter will comprise pure polyvinylidene fluoride. If the copolymer product is to be made sufficiently homogeneous, the monomers must be added incrementally or continuously so that the monomer composition is maintained at a constant level or the conversion is restricted to about 35 percent, where the copolymer does not vary by more than $\pm 2$ mole percent from the average. To produce a copolymer of desired molar ratio through increment feeding, it is necessary to determine the molar ratio required for the initial monomer charge, which will, at the instant polymerization begins, yield a copolymer of desired molar ratio. As the conconcentration of the less reactive monomer increases, increment charges of composition designed to restore or maintain the molar ratio of the monomer phase at or near the initial molar level, are added. The number of increment feedings will be governed by the molar spread which may be tolerated. When the increment charges become so numerous as to be continuous, a charge of constant composition (the composition being equal to the molar ratio of the copolymer being formed) may be pumped into the polymerization reactor at a rate equal

---

[1] Reference: "Copolymerization," F. R. Mayo and Cheves Walling, Chemical Reviews, vol. 46, pages 195–197.

to the rate of polymerization. The variations involved in continuous feeding will be limited to the errors imposed by the pumping apparatus itself.

In general, the feed composition will comprise between about 5 mole percent and about 75 mole percent of the perfluorochloroethylene and the remainder of the copolymer feed being made up of the fluoroethylene to produce a copolymer comprising between about 20 and about 69 mole percent of the perfluorochloroethylene. To produce a copolymer within the preferred range in which the perfluorochloroethylene is present in an amount of between about 25 and about 50 mole percent, the feed composition will comprise between about 7 mole percent and about 40 mole percent of the perfluorochloroethylene.

The aforementioned copolymerization reaction between the perfluorochloroethylene and the fluoroethylene monomers to produce the copolymers of the present invention, is carried out at pressures between about 50 and about 525 pounds per square inch.

As previously indicated, the copolymers of the present invention are particularly suited and useful as durable, flexible coatings for application to fabric and metal surfaces. Particularly useful solvents comprise the aliphatic and aromatic esters, the ether alcohols and ketones. Typical of the ketones, are di-isobutyl ketone, methyl ethyl ketone, methyl isobutyl ketone, cyclohexanone and acetone. Typical ether alcohols, are methoxy ethanol, ethoxy ethanol, ethoxy ethoxy ethanol. Typical of the esters, are methyl acetate, butyl acetate, amyl acetate and ethyl benzoate. Each of the above described solvents is miscible with the copolymer in all proportions. However, when a major proportion of copolymer is present the solution is in the form of a plasticized material or a gel. For the purposes of this invention therefore, it is preferred to use a minor proportion of solvent. The quantity of solvent which is employed will depend upon the particular use for which the solution is intended. In most cases, the concentration of copolymer will be maintained between about 1 and about 30 percent by weight. In this instance, where the solution is to be applied by spray techniques or by other techniques which require low viscosity, the concentration of the copolymer is maintained between about 1 and about 20 weight percent. Where the solution is to be applied by dip or brush techniques, or by the use of calendering techniques or in general by any technique which requires compositions having the consistency of a cement, than a concentration of a copolymer between about 20 and about 30 percent by weight of the solvent is preferred. In order to control drying rate and also to modify the viscosity of the solution, mixtures of the above described solvents may be employed. In this latter respect, it is frequently desired to use diluents which are miscible with the solvent but which are not solvents for the copolymers. These diluents are the alcohols, aromatics, and the chlorinated hydrocarbons, such as amyl alcohol, butyl alcohol, toluene, xylene, and trichloroethylene. When these diluents are employed, preferably equal amounts by volume of diluent and solvent constitute the mixture, although the solvent in which the copolymer is completely soluble can constitute from about 25 percent to about 95 percent by volume of the mixture depending on the drying rate, viscosity, etc., which is desirable. For example, approximately 5 percent of a copolymer containing 56 mole percent of vinylidene fluoride and 44 mole percent of trifluorochloroethylene was dissolved in a mixture of equal volumes of acetone and n-butyl acetate. The addition of n-butyl alcohol, toluene, Solvesso, and trichloroethylene, did not throw the copolymer out of solution until the solvent was present in an amount less than 25 percent by volume. In connection with the solubility of these copolymers, it should be noted that it is often desirable to reduce the molecular weight of the finished copolymer of the present invention, in order to obtain greater solubility in organic solvents, such as those indicated above. This is of importance in order to obtain increased softness in the rubbery characteristics of the polymer for easier processability. The polymerization reactions which are carried out in the presence of the polymerization type catalysts of the present invention normally tend to form very high molecular weight copolymeric products. Reduction of the strength of the recipe or polymerization catalyst merely slows the rate of reaction without affecting, appreciably the molecular weight of the finished copolymer. It has been found, however, that the addition of various polymerization modifiers, appreciably reduces the molecular weight of the copolymer products, and increases their solubility and ease of processability without affecting, unduly, the overall yield. Suitable polymerization modifiers include chloroform ($CHCl_3$), Freon 113 ($CF_2ClCFCl_2$), carbon tetrachloride ($CCl_4$), trichloroacetyl chloride ($CCl_3COCl$), dodecyl mercaptan ($C_{12}H_{25}SH$), and bromotrichloromethane ($CBrCl_3$). These modifiers are preferably added in amounts between about 1 to 10 parts, by weight, per 100 parts of total perfluorochloroethylene and fluoroethylene monomers charged to the polymerization reaction. Of these modifiers dodecyl mercaptan is preferred. This particular modifier appears to be much more powerful in function, than any of the others disclosed above and is, therefore, preferably employed in quantities ranging from 0.01 to 0.3 part per 100 parts of total monomer charged to the polymerization reaction.

The following examples are offered for a better understanding of the present invention and are not to be construed as limiting its scope.

*Example I*

This example is intended to illustrate the preparation of a copolymer of trifluorochloroethylene and vinylidene fluoride.

The following water-suspension type recipe was employed in carrying out the polymerization reaction:

| | Parts by weight |
|---|---|
| Water, distilled | 200. |
| $CF_2=CFCl$ | 64.5 ⎫ 50/50 molar |
| $CF_2=CH_2$ | 35.5 ⎭ |
| $K_2S_2O_8$ | 1.0 |
| $Na_2S_2O_5$ | 0.4 |
| $FeSO_4 \cdot 7H_2O$ | 0.1 |

Catalyst and activator solution was prepared by dissolving 1 part of $K_2S_2O_8$ in 20 parts of water. Next, 0.4 part of $Na_2S_2O_5$ were dissolved in another 20 parts of water. In still another 20 parts of water, 0.1 part of $FeSO_4 \cdot 7H_2O$ was dissolved.

140 parts of water were next charged to a silver-lined steel bomb. The aforementioned $K_2S_2O_8$, $Na_2S_2O_5$, and the $FeSO_4 \cdot 7H_2O$ solutions were then added in succession. The contents of the bomb were frozen after each addition. The bomb was then closed and evacuated. Thereafter, 64.5 parts of $CF_2=CFCl$ and 35.5 parts of $CF_2=CH_2$ were flash-distilled into it. The bomb was then rocked at room temperature (between about 25° C. and about 35° C.) over a period of 48 hours.

The residual monomer was then vented from the bomb and a mixture of water and chunks of rubbery polymer were discharged. These chunks were washed with hot water to remove residual salts, and were then dried in vacuo at room temperature.

The mole percent of $CF_2=CFCl$, combined in the resulting copolymeric product, and the percent conversion as dependent upon the polymerization time, is indicated, from the data obtained in the following table:

| No. | Polymerization Time, hours | Percent Conversion | Mole Percent $CF_2=CFCl$ Combined |
|---|---|---|---|
| 1 | 3.5 | 11 | 57 |
| 2 | 4 | 20 | 67 |
| 3 | 16 | 54 | 63 |
| 4 | 24 | 89 | 49 |
| 5 | 48 | 96 | 54 |

Example II

The procedure, illustrated by Example I, was repeated except that the following water-suspension type recipe was employed in the preparation of the trifluorochloroethylene/vinylidene fluoride copolymer:

| | Parts by weight | |
|---|---|---|
| Water, distilled | 200. | |
| $CF_2=CFCl$ | 73. | 60/40 molar |
| $CF_2=CH_2$ | 27. | |
| $K_2S_2O_8$ | 1.0 | |
| $Na_2S_2O_5$ | 0.4 | |
| $FeSO_4 \cdot 7H_2O$ | 0.1 | |

The results obtained following the aforementioned procedure, in employing the aforementioned recipe, are indicated as follows:

| No. | Polymerization Time, hours | Percent Conversion | Mole Percent $CF_2=CFCl$ Combined |
|---|---|---|---|
| 1 | 24 | 30 | 57 |
| 2 | 48 | 35 | 66 |
| 3 | 64 | 90 | 59 |

As previously indicated, the water-suspension recipe type catalysts, employed in carrying out the polymerization reaction to produce the improved copolymers of the present invention contain an oxidant, in the form of a persulfate, or other peroxy compounds, of this type; a reductant, which is preferably a bisulfite, and a variable valence metal salt, which is preferably in the form of an iron salt. In this respect, it should be noted that the presence of the reductant and variable valence metal salt makes possible an increase in the quantity of free radicals which facilitates the ease of polymerization. However, it is also within the scope of this invention to carry out the polymerization reaction with the aforementioned water-suspension type recipe, in which the recipe contains only an oxidant (e. g., one of the aforementioned peroxy compounds), and eliminate the presence of either the reductant or variable valence metal salt, or both.

The following examples are intended to illustrate the preparation of a copolymer of trifluorochloroethylene and vinylidene fluoride, employing a water-suspension type recipe, containing only an oxidant, of the peroxy type, viz., potassium persulfate. The presence of a reductant or a variable valence metal salt, has been eliminated.

Example III

The procedure, illustrated by Example I, was repeated except that the following water-suspension type recipe was employed in the preparation of the trifluorochloroethylene/vinylidene fluoride copolymer:

| | Parts by weight | |
|---|---|---|
| Water, distilled | 100. | |
| $CF_2=CFCl$ | 85. | 75/25 molar |
| $CF_2=CH_2$ | 15. | |
| $K_2S_2O_8$ | 0.05 | |

Catalyst and activator solution was prepared by dissolving 0.05 part of $K_2S_2O_8$ in 100 parts of water. To a silver-lined steel bomb, the potassium persulfate solution was charged. The contents of the bomb were then frozen, and the bomb was closed and evacuated. 85 parts of $CF_2=CFCl$ and 15 parts of $CF_2=CH_2$ were then flash-distilled into the bomb. The bomb was then rocked at room temperature (between about 25° C. and 35° C.) for a period of 63 hours.

The residual monomer was then vented from the bomb and a mixture of water and chunks of rubbery polymer were discharged. These chunks were washed with hot water to remove residual salts, and were then dried in vacuo at room temperature.

The mole percent of $CF_2=CFCl$ combined in the copolymer was found to be 69 percent with a 29 percent conversion.

Example IV

The procedure, illustrated by Example III, was repeated except that the following water-suspension type recipe was employed in the preparation of the trifluorochloroethylene/vinylidene fluoride copolymer:

| | Parts by weight | |
|---|---|---|
| Water, distilled | 100. | |
| $CF_2=CFCl$ | 38. | 25/75 molar |
| $CF_2=CH_2$ | 62. | |
| $K_2S_2O_8$ | 0.5 | |

Catalyst and activator solution was prepared by dissolving 0.5 part of $K_2S_2O_8$ in 100 parts of water. To a silver-lined steel bomb the potassium persulfate solution was charged. The contents of the bomb were then frozen and the bomb was closed and evacuated. 38 parts of $CF_2=CFCl$ and 62 parts of $CF_2=CH_2$ were then flash-distilled into the bomb. The bomb was then rocked at room temperature (between about 25° C. and about 35° C.) for a period of 21 hours.

The residual monomer was then vented from the bomb and a mixture of water and chunks of rubbery polymer were discharged. These chunks were washed with hot water to remove residual salts, and were then dried in vacuo at room temperature.

The mole percent of $CF_2=CFCl$ combined in the copolymer was found to be 25 percent with a 70 percent conversion.

Example V

This example is intended to illustrate the preparation of a copolymer of trifluorochloroethylene and vinylidene fluoride, employing an organic peroxide promoter, viz., trichloroacetyl peroxide, in a mass polymerization system.

The polymerization was carried out in a glass tube containing a feed comprising about 30 mole percent trifluorochloroethylene and about 70 mole percent vinylidene fluoride, in the presence of trichloroacetyl peroxide as the promoter. The tube was placed in a bath maintained at a temperature of approximately −15° C. for a period of about seven days. At the end of that time, the tube was removed from the bath. The mole percent of trifluorochloroethylene combined in the copolymer was found to be about 43.5 percent with a 94.8 percent conversion of the total monomers charged.

The finished copolymer was then pressed between chrome-plated ferrotype plates in an electrically heating carver press at a temperature of about 250° C., for a period of about five minutes. It was found that a clear, tough, flexible rubbery polymer sheet had been produced.

Example VI

The procedure, illustrated by Example V, was repeated, employing trichloroacetyl peroxide as an organic peroxide promoter, in a mass polymerization system.

The polymerization was carried out in a glass tube containing a feed comprising about 70 mole percent trifluorochloroethylene and about 30 mole percent vinylidene fluoride. The tube was placed in a bath maintained at a temperature of approximately −15° C. for a period of about seven days. At the end of that time, the tube was removed from the bath. The mole percent of trifluorochloroethylene combined in the copolymer was found to be about 65.6 percent with a 74.4 percent conversion of the total monomers charged.

The finished copolymer was then pressed between chrome-plated ferro-type plates in an electrically heating carver press at a temperature of about 250° C., for a period of about five minutes. It was found that a clear, tough, flexible rubbery polymer sheet had been produced.

As previously indicated, the copolymers of the present invention prepared by copolymerizing a perfluorochloroethylene with a fluoroethylene within the critical molar ratios and under the polymerization conditions previously described, possess unusual and highly desirable chemical and physical properties which make them particularly suited as durable, flexible coatings for application to various fabric surfaces. These surfaces may, in a preferred form for application, take the form of protective clothing (e. g., as suits, boots, gloves, helmets and other wearing apparel), and other articles of manufacture which are comprised of exposed surfaces which may be subjected to bending, folding, or other forms of distortion in the course of performing their function under special environmental conditions. Particular applicability of the copolymers of the present invention is to be found when they are employed as protective coatings on surfaces, such as stated above, which are to be subjected to environmental conditions in which they may come into contact with corrosive substances, such as oils, fuels and various powerful reagents, as previously described, and over a wide temperature range. These copolymeric coatings are found to have high tensile strength, good elastomeric properties, hardness, high heat-resistance, and ease of solubility in various solvents, when in their raw copolymeric state for application to various surfaces and can be pressed into sheets at temperatures between about 350° F. and about 500° F. These advantages are only obtainable by forming the copolymers under the polymerization conditions previously described, and within the molar ratios previously defined (viz., with a content of between about 20 mole percent and about 69 mole percent of the perfluorochloroethylene and the remaining major constituent being the fluoroethylene).

When employed as protective coatings, for any of the surfaces described above, the raw copolymer is dissolved in a suitable solvent to obtain an adherent cement. Solution of the copolymer is effected by forming a mixture of the copolymer, in an amount preferably below about 50 percent by weight, with at least one of the oxygen-containing solvents described above, and maintaining the copolymer in contact with the solvent under suitable conditions for a sufficient period of time to effect the solution. Usually the solution is prepared by mixing the solvent and the copolymer in blending equipment, such as a ball mill, pebble mill, etc. Time necessary to effect solution varies between 1 and 16 hours depending principally on the concentration of copolymer. Elevated temperatures, i. e., temperatures up to the boiling point of the solvent can be employed to hasten the formation of the solution. The solutions which are prepared as described above, exist and are stable, i. e., do not precipitate, at room temperature. In connection with the solvent, it should be noted that these are relatively low boiling compounds having a boiling point between about 55° and about 160° C., oxygen-containing compounds boiling above about 160° C. are not suitable since they are not efficient solvents for the copolymer except at elevated temperatures and additionally since they are not volatile enough for the purpose intended.

As indicated previously, the solutions of this invention can be applied to fabric, metal, glass and other surfaces by employing apparatus, such as a knife-spreader, a doctor-blade, reverse roll-coater and by spray, brush and dip coating techniques. After the solution has been applied to the desired surface, the solvent is allowed to evaporate either at room temperature or preferably, in order to facilitate evaporation, by heating at slightly elevated temperatures, that is temperatures below about 160° C. The copolymer coating can be applied to the desired surface either as a single coating or by application of a number of coats. In this latter instance, the solvent is permitted to evaporate after each application. As indicated previously, the viscosity of the solution can be adjusted by the addition of at least one non-solvent inert diluent. These non-solvent inert diluents should have boiling points approximating (i. e. within about 20° C.) the boiling point of the solvent, and below about 160° C. For special purposes, pigments, fillers and other additions can be incorporated within the copolymer.

Various alterations and modifications of the invention and its aspects may become apparent to those skilled in the art without departing from the scope of this invention.

Having thus described our invention, we claim:

1. A solution which comprises as a solute a copolymer containing between about 20 and about 69 mole percent of a perfluorochloroethylene copolymerized with a different partially fluorinated ethylene as the remaining major constituent and as a solvent at least one oxygen containing saturated aliphatic organic compound having a boiling point between about 55° C. and about 160° C. of the group consisting of esters, ketones and ether alcohols.

2. A solution which comprises as a solute a copolymer containing between about 20 and about 69 mole percent of trifluorochloroethylene copolymerized with vinylidene fluoride as the remaining major constituent and as a solvent at least one oxygen containing saturated aliphatic organic compound having a boiling point between about 55° C. and about 160° C. of the group consisting of esters, ketones and ether alcohols.

3. A solution which comprises as a solute a copolymer containng between about 20 and about 69 mole percent of trifluorochloroethylene copolymerized with vinylidene fluoride as the remainng major constituent and as a solvent a saturated aliphatic ketone having a boiling point between about 55° C. and about 160° C.

4. The solution of claim 3 in which the ketone is methyl ethyl ketone.

5. The solution of claim 3 in which the ketone is methylisobutyl ketone.

6. A solution which comprises as a solute a copolymer containing between about 20 and about 69 mole percent of trifluorochloroethylene copolymerized with vinylidene fluoride as the remaining major constituent and as a solvent a saturated aliphatic ester having a boiling point between about 55° C. and about 160° C.

7. The solution of claim 6 in which the ester is ethyl acetate.

8. The solution of claim 6 in which the ester is amyl acetate.

9. A solution which comprises as a solute a copolymer containing between about 20 and below about 69 mole percent of trifluorochloroethylene copolymerized with vinylidene fluoride as the remaining major constituent and as a solvent a saturated aliphatic ether alcohol having a boiling point between about 55° C. and about 160° C.

10. The solution of claim 9 in which the ether alcohol is ethoxy ethanol.

11. A solution which comprises as a solute a copolymer containing between about 20 and about 69 mole percent of trifluorochloroethylene copolymerized with vinylidene fluoride as the remaining major constituent, as a solvent an oxygen containing saturated aliphatic organic compound having a boiling point between about 55° C. and about 160° C. of the group consisting of ketones, esters and ether alcohols and as an inert diluent an organic compound having a boiling point below about 160° C. of the group consisting of saturated aliphatic alcohols, aromatic hydrocarbons and aliphatic chlorinated hydrocarbons.

12. The solution of claim 11 in which the inert diluent is a saturated aliphatic alcohol boiling below about 160° C.

13. The solution of claim 11 in which the alcohol is amyl alcohol.

14. The solution of claim 11 in which the alcohol is butyl alcohol.

15. The solution of claim 11 in which the inert diluent is an aromatic hydrocarbon boiling below about 160° C.

16. The solution of claim 15 in which the aromatic hydrocarbon is toluene.

17. The solution of claim 15 in which the aromatic hydrocarbon is xylene.

18. The solution of claim 11 in which the inert diluent is an aliphatic chlorinated hydrocarbon boiling below about 160° C.

19. The solution of claim 18 in which the chlorinated hydrocarbon is carbon tetrachloride.

20. The method for preparing solutions of copolymers containing between about 20 and about 69 mole percent of a perfluorochloroethylene copolymerized with a different partially fluorinated ethylene as the remaining major substituent which comprises forming a mixture of said copolymer with at least one oxygen containing saturated aliphatic organic compound having a boiling point between about 55° C. and about 160° C. of the group consisting of ketones, esters and ether alcohols and maintaining said mixture under conditions of temperature and time such that a homogeneous solution containnig at least 1 percent of said copolymer is formed.

References Cited in the file of this patent

UNITED STATES PATENTS 2,484,483    Berry _____ Oct. 11, 1949